(12) United States Patent
Okazaki et al.

(10) Patent No.: US 8,237,839 B2
(45) Date of Patent: *Aug. 7, 2012

(54) ELECTRONIC CAMERA

(75) Inventors: Seishin Okazaki, Kyoto (JP); Hiromichi Fujii, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/798,295

(22) Filed: Apr. 1, 2010

(65) Prior Publication Data

US 2010/0259664 A1 Oct. 14, 2010

Related U.S. Application Data

(63) Continuation of application No. 10/793,136, filed on Mar. 4, 2004, now Pat. No. 7,710,487.

(30) Foreign Application Priority Data

Mar. 7, 2003 (JP) .................................. 2003-60773

(51) Int. Cl.
*H04N 5/222* (2006.01)
(52) U.S. Cl. ................................. 348/333.02
(58) Field of Classification Search ............ 348/333.01, 348/333.02, 333.11, 333.12, 345, 362.363; 396/48, 287, 292, 296
See application file for complete search history.

(56) References Cited

U.S. PATENT DOCUMENTS

| 5,534,965 | A | 7/1996 | Higaki et al. | 354/409 |
| 6,137,534 | A | 10/2000 | Anderson | 348/222 |
| 6,879,342 | B1 | 4/2005 | Miller et al. | 348/333.05 |
| 7,319,488 | B2 | 1/2008 | Sagiya | 348/362 |
| 7,710,487 | B2 * | 5/2010 | Okazaki et al. | 348/333.02 |

FOREIGN PATENT DOCUMENTS

| JP | 59-164363 | 11/1984 |
| JP | 2-86270 | 7/1990 |
| JP | 04-211580 | 8/1992 |
| JP | 07-134239 | 5/1995 |
| JP | 07-134240 | 5/1995 |
| JP | 09-080610 | 3/1997 |
| JP | 2002-051238 | 2/2002 |
| JP | 2002-262135 | 9/2002 |

* cited by examiner

*Primary Examiner* — Timothy J Henn
(74) *Attorney, Agent, or Firm* — Gerald T. Bodner

(57) ABSTRACT

An electronic camera includes a shutter button. When the shutter button is half-depressed, a photographing condition such as an exposure time period and an aperture amount is adjusted by a main CPU, and characters indicative of the adjusted photographing condition are displayed on an LCD. When the shutter button is full-depressed, an image signal of an object is recorded in a recording medium. It is noted that a time difference between a timing of half-depressing the shutter button and a timing of full-depressing the shutter button is lower than a threshold value, a flag is set to "1", and a display of the characters is prohibited. Prohibiting the characters from being displayed makes it possible to promptly execute a photographing of the object in response to the full-depression of the shutter button.

10 Claims, 5 Drawing Sheets (A)

(B)

ELECTRONIC CAMERA

CROSS-REFERENCE TO RELATED APPLICATIONS

This application is a continuation of co-pending U.S. application Ser. No. 10/793,136, filed on Mar. 4, 2004, and entitled, "Electronic Camera", the disclosure of which is incorporated herein by reference, which is based on and claims priority to Japanese Patent Application Serial No. 2003-60773, filed on Mar. 7, 2003.

BACKGROUND OF THE INVENTION

1. Field of the Invention

The present invention relates to an electronic camera. More specifically, the present invention relates to an electronic camera which adjusts a photographing condition (imaging condition) in response to an adjusting instruction, displays photographing condition information (imaging condition information) on a monitor, and records an object image in response to a recording instruction after the adjusting instruction.

2. Description of the Prior Art

In conventional such a kind of electronic camera, when a shutter button is half-depressed, a photographing condition such as an exposure amount, a focus and etc. is adjusted, and after the adjustment, photographing condition information such as an optimal exposure amount, a focal point and etc. is displayed on a monitor screen. Then, when the shutter button is full-depressed, a main photographing is performed according to the adjusted photographing condition, and an image signal obtained by the main photographing is recorded in a recording medium.

Herein, the shutter button is shifted to a full-depressed state from a half-depressed state, and therefore, in the prior art, the photographing condition information is always displayed on the monitor prior to the main photographing.

However, it takes about 100 milliseconds to display the photographing condition information. Therefore, there is a problem of missing a shutter chance in the prior art in which the photographing condition information is displayed at all times prior to the main photographing.

SUMMARY OF THE INVENTION

Therefore, it is a primary object of the present invention to provide an electronic camera capable of preventing a shutter chance (perfect moment to take a picture) from being missed.

An electronic camera according to the present invention comprises: an imager for imaging an object; an adjuster for adjusting an imaging condition in response to an adjusting instruction; a displayer for displaying imaging condition information indicative of the imaging condition adjusted by the adjuster; a recorder for recording in a recording, medium an image signal of the object in response to a recording instruction after the adjusting instruction; and a prohibiter for prohibiting a displaying operation of the displayer when a time difference between a timing of issuing the adjusting instruction and a timing of issuing the recording instruction is lower than a threshold value.

When the adjusting instruction is issued, the imaging condition is adjusted by the adjuster, and the imaging condition information indicative of the adjusted imaging condition is displayed by the displayer. When a recording instruction is issued after the adjusting instruction, the image signal of the object by the imager is recorded in the recording medium. It is noted that when the time difference between the timing of issuing the adjusting instruction and the timing of issuing the recording instruction is lower than the threshold value, the displaying operation by the displayer is prohibited by the prohibiter.

Prohibiting the photographing condition information from being displayed makes it possible to promptly execute the photographing of the object in response to the recording instruction. Accordingly, this prevents the shutter chance from being missed.

Preferably, a character signal indicative of the imaging condition information is written to a first memory area by a first writer, and the character signal stored in the first memory area is read by a first reader. At this time, the prohibiter disables at least the first writer. Thus, the display of the imaging condition information is prohibited.

More preferably, the first writer performs a writing operation in response to a timing signal periodically generated, and the first reader performs a reading operation in response to the timing signal. Performing a writing/reading in response to the timing signal takes so long to display the imaging condition information. Prohibiting such the displaying process makes it possible to promptly execute a photographing process in response to a recording process.

Furthermore, the imager repeatedly images the object in response to the timing signal before the recording instruction being issued. Each of the image signals obtained by repeated imaging operations is written to a second memory area by a second writer in response to the timing signal. A second reader reads each of the image signals stored in the second memory area in response to the timing signal in order to display a motion image of the object. Thus, the motion image of the object is displayed in response to the timing signal, and the displaying process of the character is executed in response to the same timing signal, and whereby, it is possible to superpose the character on the motion image.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 (B) is an illustrative view showing another example of the image displayed on the LCD;

DETAILED DESCRIPTION OF THE PREFERRED EMBODIMENTS

Figure 1:
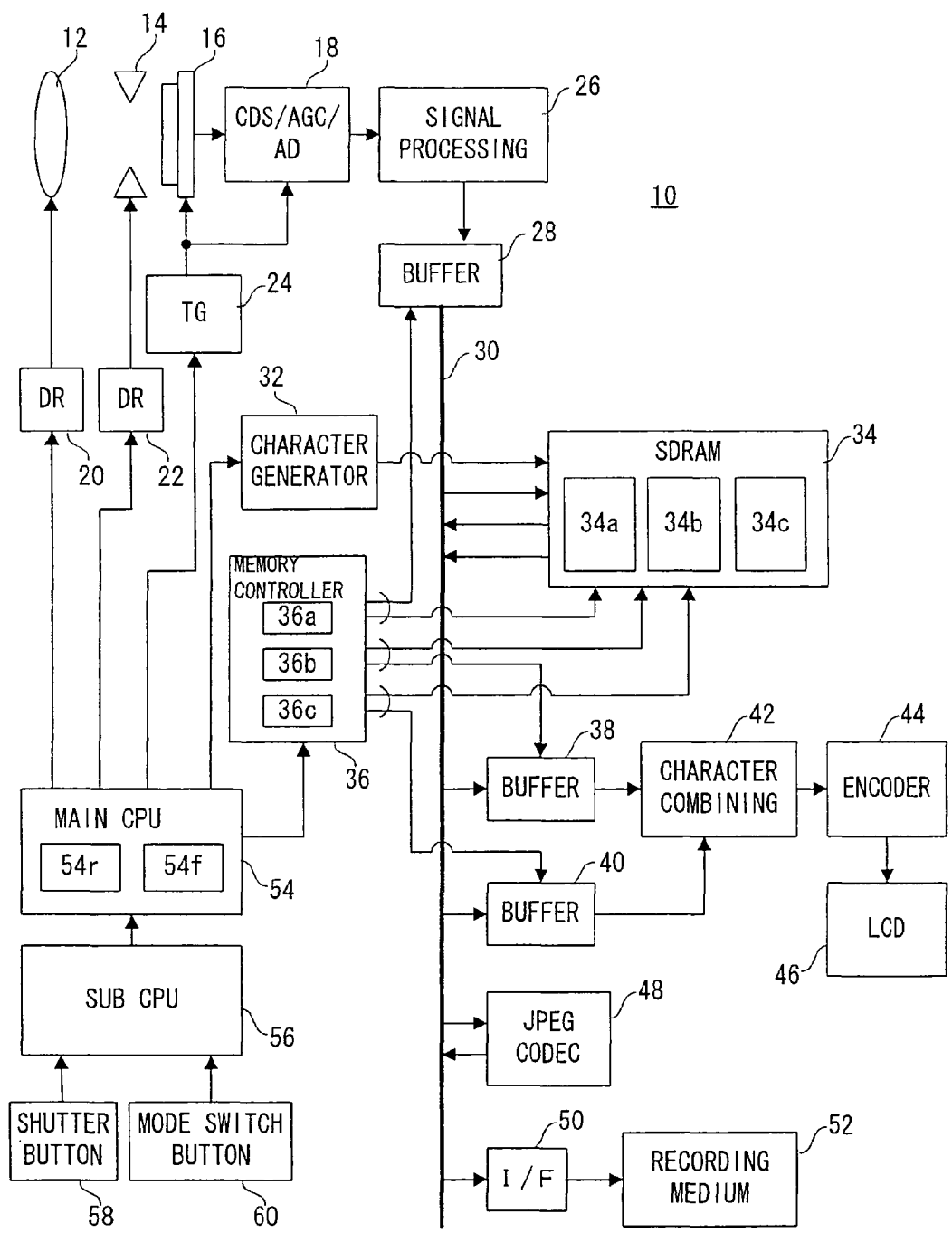
FIG. 1 is a block diagram showing one embodiment of the present invention.

Referring to FIG. 1, an electronic camera (digital camera) 10 of this embodiment includes a focus lens 12 driven by a driver 20 and an aperture unit 14 driven by a driver 22. An optical image of an object is incident to a light-receiving surface of an image sensor 16 through such the members.

When a camera mode is selected by a mode switching button 60, a state signal corresponding thereto is applied from a sub CPU 56 to a main CPU 54. The main CPU 54 instructs a TG 24 to repeat a pre-exposure and a thin-out reading, and instructs a signal processing circuit 26, a character combining circuit 42, and an input controller 36a and an output controller 36b provided in a memory controller 36 to perform a predetermined processing.

The TG 24 repeatedly executes the pre-exposure of the image sensor 16 and the thin-out reading of charges obtained by the pre-exposure, in response to a vertical synchronization signal Vsync generated at a frame rate of 30 fps. The charges obtained by the pre-exposure of a previous frame, i.e., a raw image signal is output from the image sensor 16 by performing the thin-out reading of a current frame.

The raw image signal of each frame output from the image sensor 16 is subjected to a series of processes such as a noise removal, a level adjustment and an A/D conversion by a CDS/AGC/AD circuit 18, and whereby, raw image data being a digital signal is output from the CDS/AGC/AD circuit 18. The signal processing circuit 26 converts the output raw image data to image data having a YUV format, i.e., YUV image data, and writes the converted YUV image data to a buffer 28. It is noted that a sampling rate at a time of the A/D conversion is 24 MHz, and the YUV image data is written to the buffer 28 at a clock rate of 24 MHz.

The YUV image data stored in the buffer 28 is read by the input controller 36a, and written to a YUV image area 34a formed in an SDRAM 34. The YUV image data stored in the YUV image area 34a is read by the output controller 36b, and written to a buffer 38.

The buffer 28, the SDRAM 34 and the buffer 38 are connected with each other by a bus 30, and therefore, simultaneously performing a data transmission from the buffer 28 to the SDRAM 34 and a data transmission from the SDRA 34 to the buffer 38 causes a collision between data. Consequently, the controllers 36a and 36b perform a reading/writing at a clock rate of 96 MHz and at different timings with each other. Thus, transmitting the YUV image data intermittently and in a time-division manner prevents the collision between the data.

The YUV image data stored in the buffer 38 is read at a clock rate of 24 MHz by a character combining circuit 42. The character combining circuit 42 also accesses a buffer 40 in order to read character data to be combined with the YUV image data; however, the character data does not exist in the buffer 40 at this time. Therefore, the YUV image data read from the buffer 38 is as it is applied to an encoder 44.

The YUV image data has a frame rate of 30 fps, and the encoder 44 converts such the YUV image data to a composite video signal. The converted composite video signal is applied to the LCD 46, and whereby, a real-time motion image of the object shown in FIG. 2 (A), for example, i.e., a through image is displayed on a screen.

When a shutter button 58 is half-depressed, a state signal corresponding thereto is applied from the sub CPU 56 to the main CPU 54. The main CPU 54 acquires an optimal exposure time period and an optimal aperture amount on the basis of the YUV image data output from the signal processing circuit 26 so as to set the optimal exposure time period in a register 54r and set the optimal aperture amount in the aperture unit 14 by controlling the driver 22. The main CPU 54 further evaluates a degree of focusing of the object on the basis of the YUV image data from the signal processing circuit 26 so as to set the focus lens 12 to a focal point by controlling the driver 20.

The main CPU 54 further instructs a character generator 32 to generate character data indicative of the optimal exposure time period and the optimal aperture amount, and instructs an output controller 36c to read the character data. The character generator 32 writes the required character data to a character area 34b of the SDRAM 34. The output controller 36c reads the character data stored in the character area 34b, and writes the read character data to the buffer 40 through the bus 30.

At this time, the character generator 32 performs a writing at a clock rate of 96 MHz, and the output controller 36c also performs a reading/writing at a clock rate of 96 MHz. Thus, it is possible to prevent the collision between the data in the bus 30 or the SDRAM 34.

Figure 2:
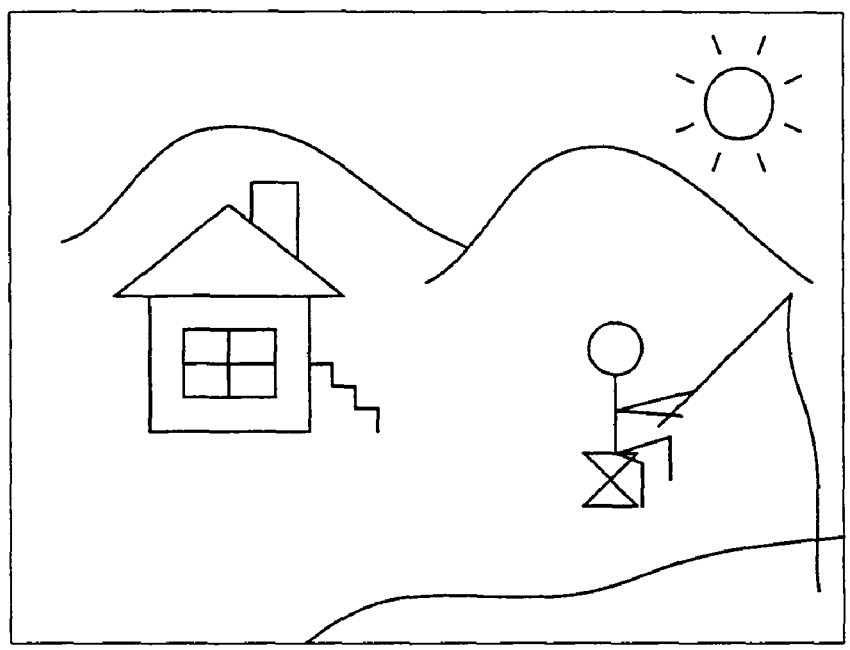
FIG. 2 (A) is an illustrative view showing one example of an image displayed on an LCD.
Figure 2:
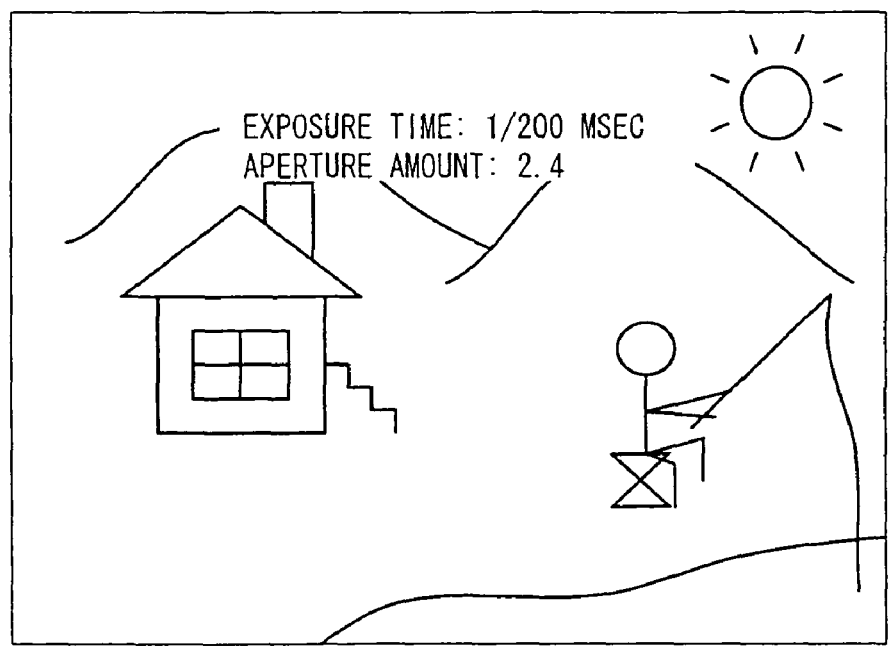

The character data stored in the buffer 40 is read at a clock rate of 24 MHz by the character combining circuit 42 so as to be combined with the YUV image data simultaneously read from the buffer 38. The encoder 44 coverts combined image data output from the character combining circuit 42 into a composite video signal, and applies the converted composite image signal to the LCD 46. Consequently, characters indicative of the optimal exposure time period and the optical aperture amount are displayed on the LCD 46 as shown in FIG. 2 (B).

When the shutter button 58 is shifted from a half-depressed state to a full-depressed state after the characters are displayed, a state signal corresponding thereto is applied from the sub CPU 56 to the main CPU 54. The main CPU 54 instructs the TG 24 to perform a main exposure according to the optimal exposure time set in the register 54r and to read all the charges obtained by the main exposure, and instructs a JPEG codec 48 to perform a compression process.

The TG 24 performs the main exposure on the image sensor 16 at a current frame and performs an all pixels reading on the image sensor 16 at a next frame. Thus, a raw image signal of one frame based on the main exposure is output from the image sensor 16. The output raw image signal is converted into YUV image data in the above-described manner, and the converted YUV image data is written to the YUV image area 34a of the SDRAM 34. The YUV image data is further applied to the encoder 44 through the buffer 38 and the character combining circuit 42 in the above-described manner so as to be converted into a composite video signal.

It is noted that the YUV image data based on the all pixel reading has a higher resolution than that based on the thin-out reading, and therefore, a resolution decreasing process is executed in the encoder 44 at the same time. Consequently, a freeze image having the same size as the through image is output from the LCD 46.

The JPEG codec 48 reads the YUV image data stored in the YUV image area 34a so as to perform a JPEG compression, and writes compressed image data thus obtained to the compressed image area 34c of the SDRAM 34. The compressed image data stored in the compressed image area 34c is hence recorded in a detachable recording medium 52 connected to an I/F 50.

As described above, when the shutter button 58 is half-depressed, the characters indicative of the optimal exposure time period and the optimal aperture amount are displayed on the LCD 46. However, it takes about 100 milliseconds to perform the writing/reading process of the character data. Thereupon, displaying the characters at all times in response to the shutter button 58 being half-depressed delays a timing of the main exposure when the shutter button 58 is directly shifted from a non-depressed state to full-depressed state, and therefore, there is a possibility of missing the shutter chance.

Consequently, in this embodiment, when the shutter button 58 is full-depressed at one stroke, the character display is omitted, so that the main exposure is promptly, executed. This makes it possible to prevent the shutter chance from being missed.

Figure 3:
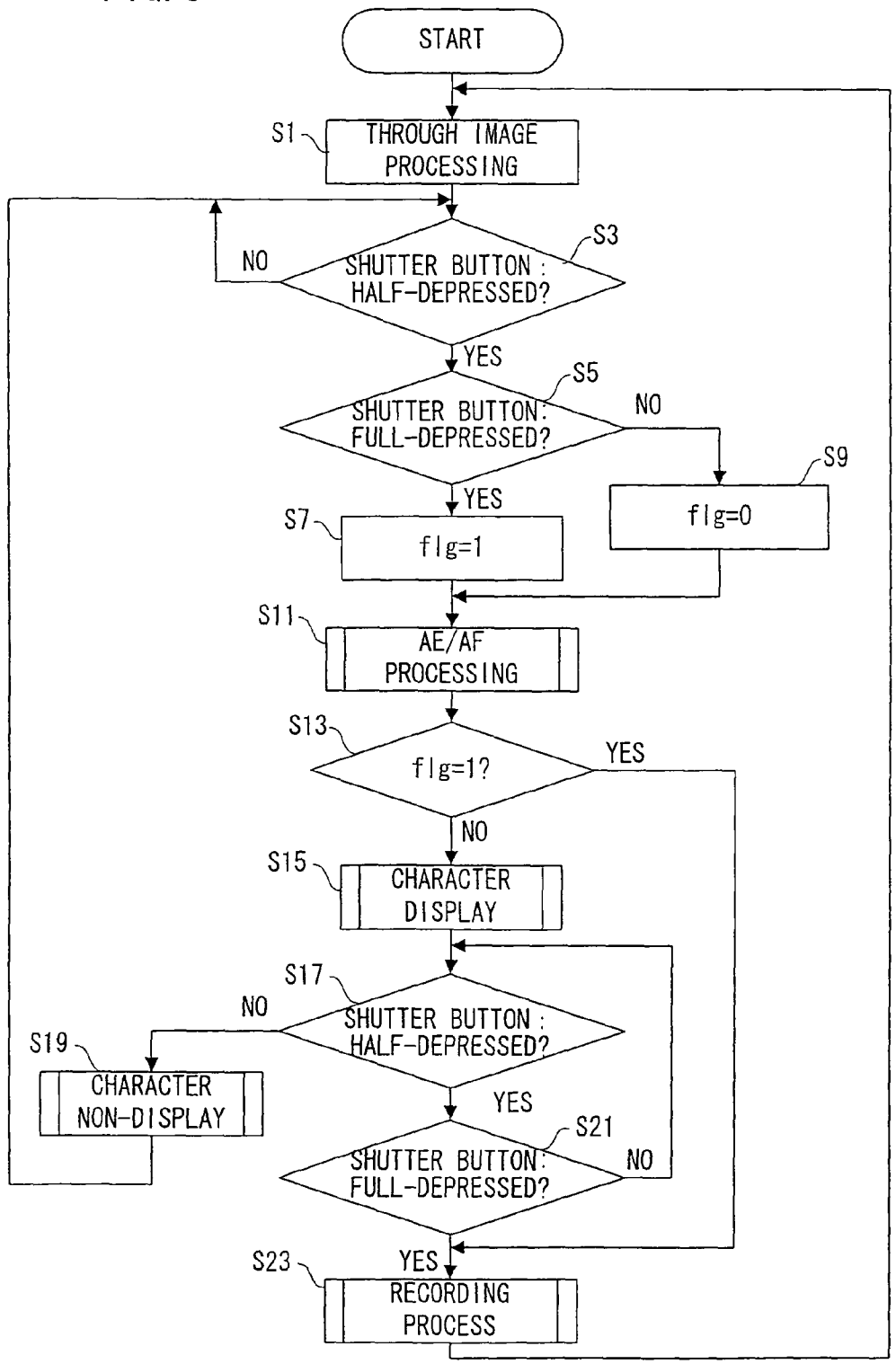
FIG. 3 is a flowchart showing a part of an operation of FIG. 1 embodiment.
Figure 4:
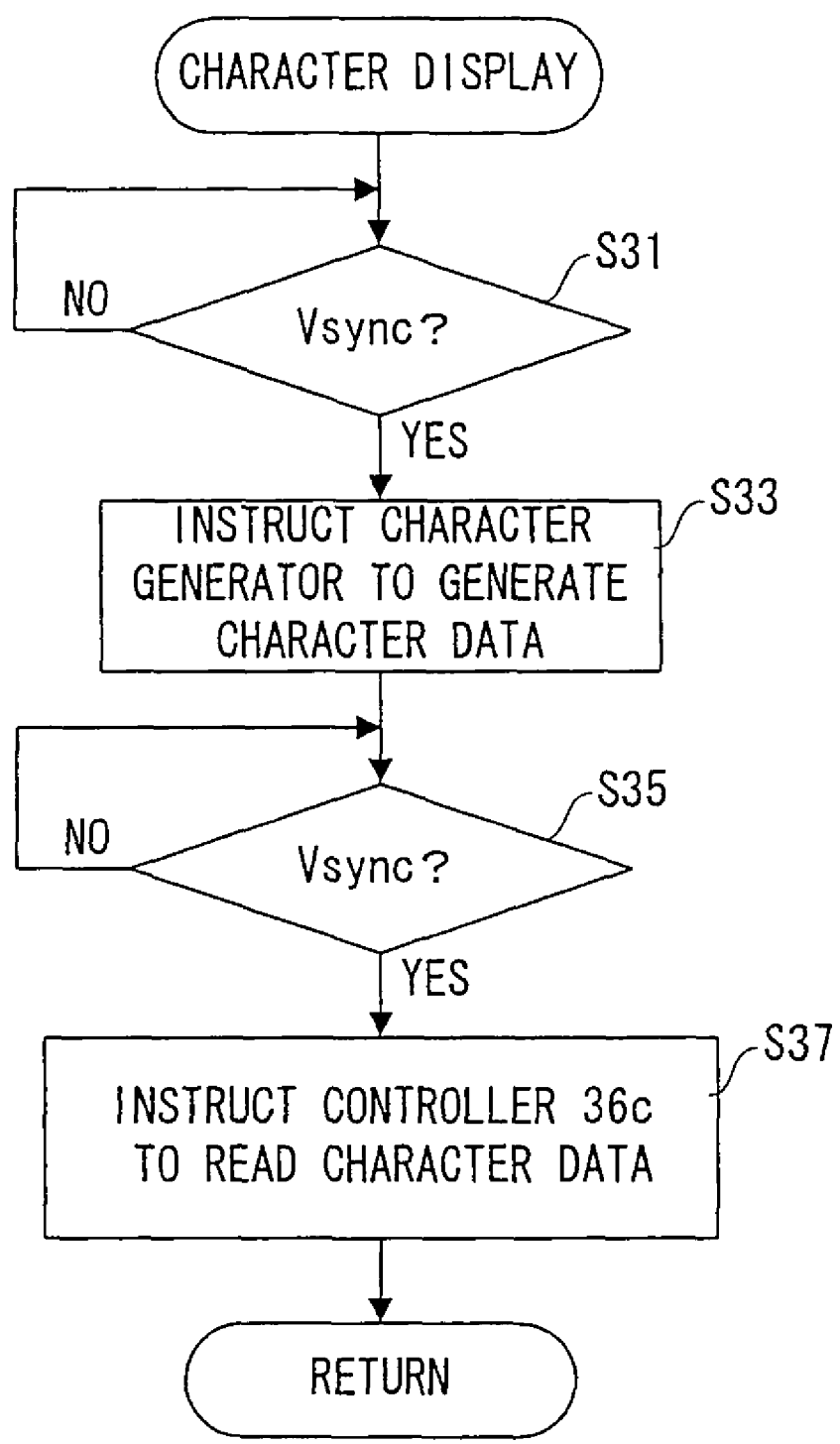
FIG. 4 is a flowchart showing another part of the operation of FIG. 1 embodiment.
Figure 5:
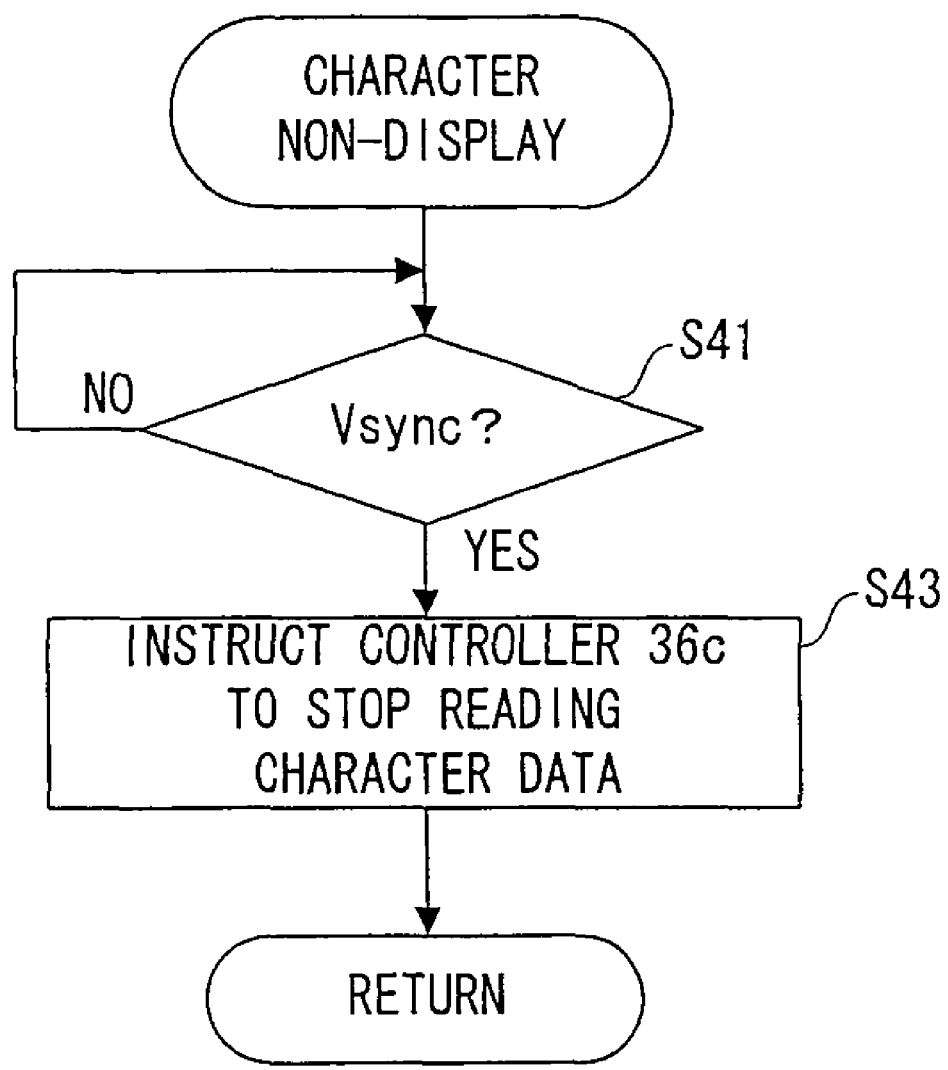
FIG. 5 is a flowchart showing the other part of the operation of FIG. 1 embodiment.

The main CPU 54 executes a process according to flowcharts shown in FIG. 3 to FIG. 5 when a camera mode is selected. First, a through image processing is executed in a step S1. More specifically, the CPU 54 instructs the TG 24 to repeatedly perform a pre exposure and a thin-out reading, and instructs the signal processing circuit 26, the character combining circuit 42 and the input controller 36a and the output controller 36b provided in the memory controller 36 to perform a predetermined process. Thus, a through image is displayed on the LCD 46.

In a step S3, it is determined whether or not the shutter button 58 is half-depressed, and if "YES", the process proceeds to a step S5. In the step S5, it is determined whether or not the shutter button 58 is full-depressed, and if "YES", a flag 54f is set to "1" in a step S7 while if "NO", the flag 54f is set to "0" in a step S9.

In this embodiment, it takes 5 milliseconds from being determined to be "YES" in the step S3 to performing the determining process in the step S5. Accordingly, if a time required from the shutter button 58 being half-depressed to being full-depressed is lower than 5 milliseconds (e.g., 3 milliseconds), the process proceeds from the step S5 to the step S7 and then, the flag 54f is set to "1".

It is noted that in the step S3 or step S5, the main CPU 54 inquires the sub CPU 56 about a state of the shutter button 58, receives an answer to the inquire from the sub CPU 56, and determines a state of the shutter button 58 from the received answer (similarly in a step S17 or step S21). Therefore, it takes about 5 milliseconds to perform the process from the step S3 to the step S5.

In a step S11, an AE/AF process is executed. Out of the process, through an AE process, the optimal exposure time period is set in the register 54r, and the optimal aperture amount is set in the aperture unit 14. Furthermore, through an AF process, the focus lens 12 is set to the focal point.

In a step S13, it is determined whether or not a setting value of the flag 54f is determined. If the setting value is "1", regarding that the shutter button 58 is full-depressed in one stroke, the process directly proceeds to a step S23. On the other hand, if the setting value is "0", regarding that the shutter button 58 is in the half-depressed state, a character displaying process is performed in a step S15. The character displaying process makes it possible to display on the LCD 46 the characters indicative of the optimal exposure time period and the optimal exposure amount obtained in the step S11.

In the steps S17 and step S21, a state of the shutter button 58 is determined. When the half-depressed state is canceled, "NO" is determined in the step S17, then, a character non-displaying process is performed in a step S19, and, the process returns to the step S3. If the half-depressed state is continued, "YES" is determined in the step S17, and the processing in the steps S17 and S21 is repeated until the shutter button is shifted from the half-depressed state to the full-depressed state. If the shutter button is shifted from the half-depressed state to the full-depressed state, "YES" is determined in the step S21, and then, the process proceeds to the step S23.

In the step S23, a recording process is performed. More specifically, the main CPU 54 instructs the TG 24 to perform the main exposure according to the optimal exposure time period set in the register 54r and the reading of all the charges obtained by the main exposure, and instructs the JPEG codec 48 to perform a compression process. Thus, a freeze image is displayed on the LCD 46, and compressed image data is recorded in the recording medium 52. After completion of the recording process, the process returns to the step S1.

The character displaying process in the step S15 complies with a subroutine shown in FIG. 4. First, it is determined whether or not a vertical synchronization signal Vsync is generated in a step S31. If "YES" is determined herein, the process proceeds to a step S33 so as to instruct the character generator 32 to generate character data indicative of the optimal exposure time period and the optimal aperture amount. The character generator 32 writes the required character data to the character area 34b of the SDRAM 34. In a step S35, it is once again determined whether or not the vertical synchronization signal Vsync is generated. Then, if "YES" is determined, a reading of the character data is instructed to the output controller 36c in a step S37. The character data stored in the character area 34b is read by the output controller 36c. Thus, the characters indicative of the optimal exposure time period and the optimal aperture amount are displayed on the LCD 46. After completion of the process in the step S37, the process returns to a hierarchical upper routine.

The character non-displaying process shown in the step S19 complies with a subroutine shown in FIG. 5. First, it is determined whether or not the vertical synchronization signal Vsync is generated in a step S41. If "YES" is determined herein, a prohibition of reading the character data is instructed to the output controller 36c in a step S43. Thus, a display of the characters indicative of the optimal exposure time period and the optimal aperture amount is prohibited. After completion of the process in the step S43, the process returns to the hierarchical upper routine.

As can be understood form the above-description, when the shutter button 58 is half-depressed, the photographing condition such as the exposure time period, the aperture amount and etc. is adjusted by the main CPU 54, and the characters indicative of the adjusted photographing condition is displayed on the LCD 46. Thereafter, when the shutter button 58 is full-depressed, the image signal of the object is recorded in the recording medium. It is noted that a time difference between a timing of half-depressing the shutter button and a timing of full-depressing the shutter button is lower than a threshold value=(5 milliseconds), regarding that the shutter button 58 is depressed at one stroke, the display of the characters is prohibited. Prohibiting the characters from being displayed makes it possible to promptly execute a photographing of the object in response to the full-depression of the shutter button 58. Thus, it is possible to prevent the shutter chance from being missed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
   an imager which images an object;
   an adjuster which adjusts an imaging condition using an image signal of the object obtained by said imager in response to an adjusting instruction;
   a recorder which records in a recording medium the image signal of the object in response to a recording instruction after the adjusting instruction;
   a displayer which displays imaging condition information related to the imaging condition adjusted by said adjuster together with the image signal of the object obtained by said imager after a timing of issuing the adjusting instruction; and
   a prohibiter which prohibits a displaying operation of the imaging condition information by said displayer at least during a time from the timing of issuing the adjusting instruction until a timing that said imager starts an imaging operation to obtain the image signal of the object to be recorded by said recorder when a time difference between the timing of issuing the adjusting instruction and a timing of issuing the recording instruction is lower than a threshold value;

wherein the prohibiter includes:

a determiner which determines whether or not the recording instruction has been input, wherein the determination occurs within a fixed time after the adjusting instruction has been input.

2. An electronic camera according to claim 1, wherein said displayer includes a first writer for writing to a first memory area a character signal indicative of the imaging condition information and a first reader for reading the character signal stored in said first memory area, and said prohibiter disables at least said first writer.

3. An electronic camera according to claim 2, wherein said first writer performs a writing operation in response to a timing signal periodically generated, and said first reader performs a reading operation in response to the timing signal.

4. An electronic camera according to claim 3, wherein said imager repeatedly images said object in response to the timing signal before the recording instruction being issued, said electronic camera further comprising:

a second writer for writing each of the image signals obtained by repeated imaging operations to a second memory area in response to the timing signal; and a second reader for reading each of the image signals stored in said second memory area in response to the timing signal in order to display a motion image of said object.

5. An information display controlling method of an electronic camera provided with an imager which images an object, comprising steps of:

(a) adjusting an imaging condition using an image signal of the object obtained by said imager in response to an adjusting instruction;

(b) recording in a recording medium the image signal of the object in response to a recording instruction after the adjusting instruction;

(c) displaying imaging condition information related to the imaging condition adjusted by said step (a) together with the image signal of the object obtained by said imager after a timing of issuing the adjusting instruction; and (d) prohibiting a displaying operation of the imaging condition information in said step (c) at least during a time from the timing of issuing the adjusting instruction until a timing that said imager starts an imaging operation to obtain the image signal of the object to be recorded by said step (b) when a time difference between the timing of issuing the adjusting instruction and a timing of issuing the recording instruction is lower than a threshold value;

wherein said (d) of prohibiting a displaying operation includes the following sub-step:

(d1) determining whether or not the recording instruction has been input, wherein the determination occurs within a fixed time after the adjusting instruction has been input.

6. An electronic camera comprising:

an imager which images an object;

an adjuster which adjusts an imaging condition using an image signal of the object obtained by said imager in response to an adjusting instruction;

a recorder which records in a recording medium the image signal of the object in response to a recording instruction after the adjusting instruction;

a displayer which displays imaging condition information related to the imaging condition adjusted by said adjuster together with the image signal of the object obtained by said imager after a timing of issuing the adjusting instruction; and a prohibiter which prohibits a displaying operation of the imaging condition information by said displayer at least during a time from the timing of issuing the adjusting instruction until a timing that said imager starts an imaging operation to obtain the image signal of the object to be recorded by said recorder when a time difference between the timing of issuing the adjusting instruction and a timing of issuing the recording instruction is lower than a threshold value;

wherein the prohibiter includes:

a determiner which determines whether or not the recording instruction has been input, wherein the determination occurs within a fixed dale after the adjusting instruction has been input and before the displayer displays character information.

7. An information display controlling method of an electronic camera provided with an imager which images an object, comprising steps of:

(a) adjusting an imaging condition using an image signal of the object obtained by said imager in response to an adjusting instruction;

(b) recording in a recording medium the image signal of the object in response to a recording instruction after the adjusting instruction;

(c) displaying imaging condition information related to the imaging condition adjusted by said step (a) together with the image signal of the object obtained by said imager after a timing of issuing the adjusting instruction; and (d) prohibiting a displaying operation of the imaging condition information in said step (c) at least during a time from the timing of issuing the adjusting instruction until a timing that said imager starts an imaging operation to obtain the image signal of the object to be recorded by said step (b) when a time difference between the timing of issuing the adjusting instruction and a timing of issuing the recording instruction is lower than a threshold value;

wherein said (d) of prohibiting a displaying operation includes the following sub-step:

(d1) determining whether or not the recording instruction has been input, wherein the determination occurs within a fixed time after the adjusting instruction has been input and before said step (c) of displaying character information.

8. An electronic camera according to claim 6, wherein said displayer includes a first writer for writing to a first memory area a character signal indicative of the imaging condition information and a first reader for reading the character signal stored in said first memory area, and said prohibiter disables at least said first writer.

9. An electronic camera according to claim 8, wherein said first writer performs a writing operation in response to a timing signal periodically generated, and said first reader performs a reading operation in response to the timing signal.

10. An electronic camera according to claim 9, wherein said imager repeatedly images said object in response to the timing signal before the recording instruction being issued, said electronic camera further comprising:

a second writer for writing each of the image signals obtained by repeated imaging operations to a second memory area in response to the timing signal; and a second reader for reading each of the image signals stored in said second memory area in response to the timing signal in order to display a motion image of said object.

* * * * *